(12) United States Patent
Chascsa, II et al.

(10) Patent No.: US 9,073,508 B1
(45) Date of Patent: Jul. 7, 2015

(54) DRIVER AIRBAG TO STEERING WHEEL GAP REDUCTION

(71) Applicant: FORD GLOBAL TECHNOLOGIES, LLC, Dearborn, MI (US)

(72) Inventors: James Robert Chascsa, II, Farmington Hills, MI (US); Ishak Zaman, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/325,705

(22) Filed: Jul. 8, 2014

(51) Int. Cl.
*B60R 21/215* (2011.01)
*B60R 21/203* (2006.01)
*B62D 1/04* (2006.01)
*B60Q 5/00* (2006.01)
*B60R 21/2165* (2011.01)

(52) U.S. Cl.
CPC .......... *B60R 21/215* (2013.01); *B60R 21/2037* (2013.01); *B62D 1/046* (2013.01); *B60Q 5/003* (2013.01); *B60R 21/21658* (2013.01)

(58) Field of Classification Search
USPC ....................................................... 280/731
See application file for complete search history.

(56) References Cited

U.S. PATENT DOCUMENTS

| | | | |
|---|---|---|---|
| 5,267,486 A * | 12/1993 | Niwa et al. ...................... | 74/552 |
| 5,738,369 A | 4/1998 | Durrani | |
| 6,062,592 A | 5/2000 | Sakurai et al. | |
| 6,474,682 B2 * | 11/2002 | Ikeda et al. ..................... | 280/731 |
| 6,719,324 B2 | 4/2004 | Albers et al. | |
| 7,077,427 B2 * | 7/2006 | Rhea .............................. | 280/731 |
| 7,438,312 B2 * | 10/2008 | Boullosa Vazquez et al. ............... | 280/731 |
| 7,467,808 B2 | 12/2008 | Onohara | |
| 7,823,908 B2 | 11/2010 | Matsu et al. | |
| 7,921,957 B2 * | 4/2011 | Satou et al. .................... | 180/274 |
| 7,963,554 B2 * | 6/2011 | Nakagawa et al. ........... | 280/731 |
| 9,016,716 B2 * | 4/2015 | Cowelchuk et al. ....... | 280/728.3 |
| 2005/0161308 A1 * | 7/2005 | Frisch ......................... | 200/61.54 |
| 2014/0131983 A1 * | 5/2014 | Cowelchuk et al. ....... | 280/728.3 |
| 2014/0319806 A1 * | 10/2014 | Osterfeld et al. ........... | 280/728.2 |

FOREIGN PATENT DOCUMENTS

EP 560355 A1 * 9/1993 ............. B60R 21/20
EP 1 923 275 5/2008

* cited by examiner

*Primary Examiner* — Nicole Verley

(74) *Attorney, Agent, or Firm* — Vichit Chea; Price Heneveld LLP

(57) ABSTRACT

A motor vehicle steering wheel has an airbag module received and mounted within a recess having an opening of a predetermined shape. A cover having an outer surface and inner surface is disposed over and proximate the airbag module and substantially occludes the opening of the recess. The cover has a predetermined shape corresponding to the shape of the opening of the recess and an outer edge corresponding to an inner edge of the recess. The outer edge of the cover comprises a flexible loop proximate the inner edge of the recess about the outer edge of the cover.

20 Claims, 4 Drawing Sheets

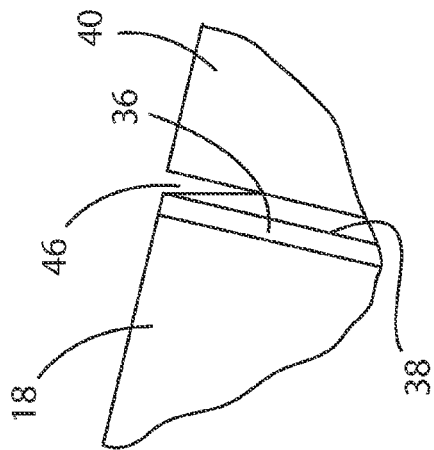
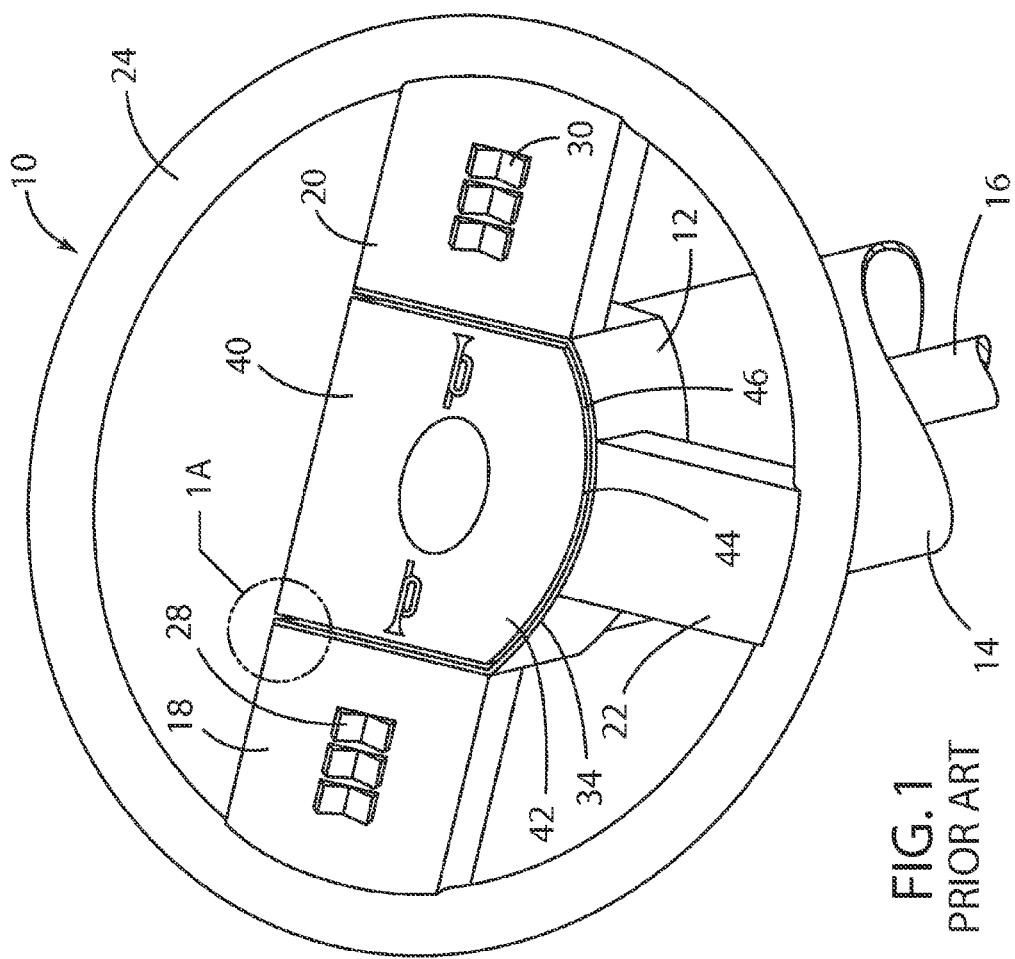
FIG. 1A
PRIOR ART
FIG. 1
PRIOR ART

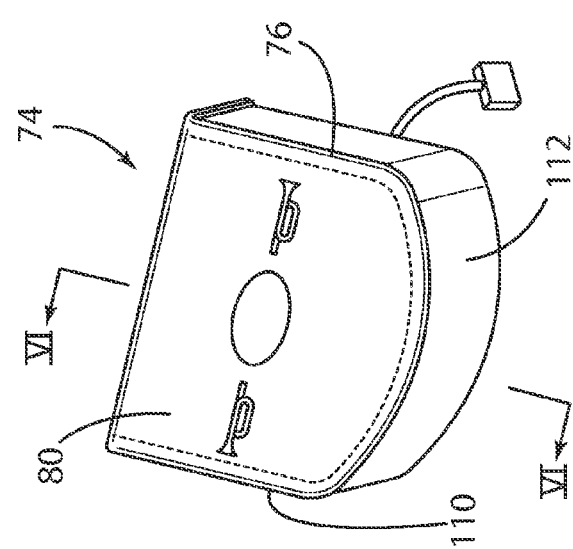
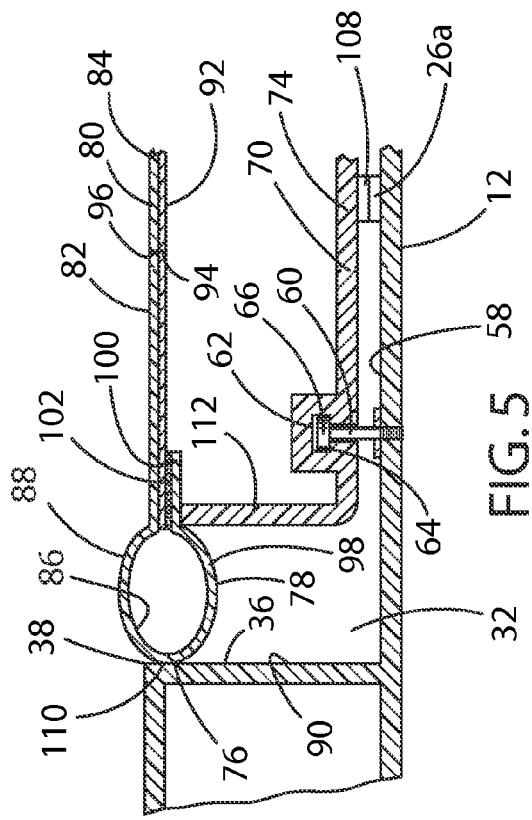
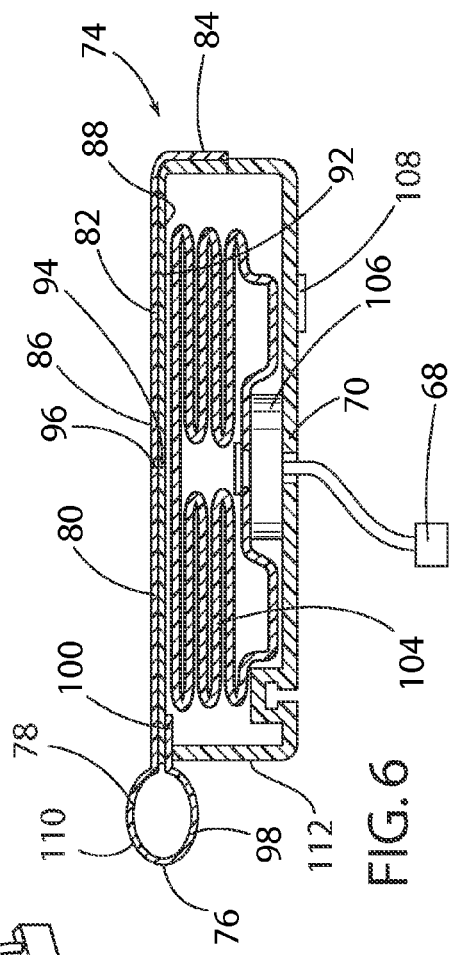

DRIVER AIRBAG TO STEERING WHEEL GAP REDUCTION

FIELD OF THE INVENTION

The present invention generally relates to a motor vehicle steering wheel within which an airbag module is mounted. More particularly, the steering wheel comprises a recess within which the airbag module is received and cover proximate an inner edge of the recess about the outer edge of the cover.

BACKGROUND OF THE INVENTION

Steering wheel assemblies for use in motor vehicles are generally well-known in the art. Traditionally, such steering wheel assemblies include a hub portion fixedly mounted to a rotatable steering column within which a steering shaft rotates. Typically, two or more spokes extend radially from the hub portion, to which a typically circular steering wheel rim is attached. Most steering wheel assemblies also include one or more controls for various motor vehicle systems, such as the horn actuation switch, which is typically actuated by depressing a central portion of the hub to close an electrical contact, which in turn energizes a horn assembly to emit an audible signal. Steering wheel assemblies may also be provided with additional controls, such as those controls used to actuate and modulate cruise control systems and controls used for interactive features of the motor vehicle, such as navigation, heating, ventilation and cooling, and hands-free mobile telephone operation. Such controls can be situated in or near the central portion of the hub or on the spokes of the steering wheel assembly.

Steering wheel assemblies are also now commonly equipped with a driver's side airbag module fitted into the hub portion. The airbag assembly is typically mounted as a preassembled module in a recess in the hub portion of the steering wheel assembly. A cover over the airbag module is typically provided to match the finish of the overall steering wheel assembly. The cover is often attached to or made integral with the preassembled airbag module.

In many applications, the horn actuation switch is located below the airbag module mounted within the recess. The horn actuation switch is thus in turn depressed and actuated by depressing the cover of the airbag module. The entire airbag module, including the airbag module cover, is therefore a movable component within the steering wheel assembly. In those cases where the airbag module is mounted as a finished preassembled module in a recess in the steering wheel assembly and the cover is attached to or made integral with the preassembled airbag module, a gap is required between the airbag module cover and the outer edge of the recess in the hub portion of the steering wheel assembly in order to facilitate actuation of the horn actuation switch. Such a gap must take into account various design considerations, such a dimensional tolerance variability and overall fit and finish.

The steering wheel assembly is a very high visible part within the interior of the motor vehicle. In those cases where the gap between the airbag module and the recess of the steering wheel assembly is visible, the gap tends to create an impression of poor craftsmanship and unacceptable standards of fit and finish. The gap also tends to produce an unpleasant tactile feedback. The gap may also allow unsightly dirt and other contaminates into the recess. Hence, solutions for improving the appearance of steering wheel assemblies within which an airbag module is mounted as a finished preassembled module would be advantageous.

The present disclosure addresses the shortcomings of the aforementioned visible gap between the driver's side airbag module and steering wheel assembly.

SUMMARY OF THE INVENTION

According to one aspect of the present disclosure, a motor vehicle steering wheel is provided within which an airbag module is mounted. The steering wheel comprises a recess within which the airbag module is received, the recess having an opening of a predetermined shape. A cover has an outer surface and inner surface disposed over and proximate the airbag module and substantially occludes the opening of the recess. The cover has a predetermined shape corresponding to the shape of the opening of the recess and an outer edge corresponding to an inner edge of the recess. The outer edge of the cover comprises a flexible loop formed by extending an overlapping portion of the cover in relation to the inner edge of the recess to overlap the inner edge of the recess, folding the overlapping portion under the cover, and attaching a distal end of the overlapping portion to the inner surface of the cover, whereby the flexible loop is proximate the inner edge of the recess about the outer edge of the cover.

Still another aspect of the present disclosure is a flexible loop integral with the cover.

Yet another aspect of the present disclosure is a flexible loop separate from the cover attached to the cover.

An additional aspect of the present disclosure is a flexible loop attached to the cover with adhesive.

Another aspect of the present disclosure is a cover fabricated from leather.

Still another aspect of the present disclosure is a cover fabricated from vinyl.

A further aspect of the present disclosure is a cover integral with and forming the outer surface of the airbag module.

Yet a further aspect of the present disclosure is a cover having an outer portion that forms a visible periphery about the cover and the flexible loop is disposed substantially completely around a visible portion of the outer periphery of the cover.

An additional aspect of the present disclosure is a flexible loop in physical contact with the inner edge of the recess.

Yet another aspect of the present disclosure is a steering wheel further comprising a horn actuation switch actuated by depressing and displacing the airbag cover and wherein the flexible loop remains proximate the inner edge of the recess about the outer edge of the cover when the horn actuation switch is actuated by depressing and displacing the cover.

Another aspect of the present disclosure is a flexible loop in physical contact with the inner edge of the recess that flexes to maintain the flexible loop in physical contact with the inner edge of the recess about the outer edge of the cover.

Yet a further aspect of the present disclosure is a steering wheel having a recess within which an airbag module is received, the recess having an opening, and a cover disposed over the airbag module and substantially occluding the opening of the recess, the cover having an outer edge corresponding to an inner edge of the recess, wherein the outer edge of the cover comprises a flexible loop proximate the inner edge of the recess about the outer edge of the cover.

Still a further aspect of the present disclosure is a steering wheel having a flexible loop in abutting contact with the inner edge of the recess.

An additional aspect of the present disclosure is a steering wheel having a flexible loop which overlaps the inner edge of the recess.

A yet additional aspect of the present disclosure is a method for mounting an airbag module within a recess in a steering wheel, the recess having an opening of a predetermined shape, the method comprising the steps of providing a cover having an outer face and inner surface disposed over and proximate the airbag module substantially occluding the opening of the recess, the cover having a predetermined shape corresponding to the shape of the opening of the recess and an outer edge corresponding to an inner edge of the recess, extending an overlapping portion of the outer edge of the cover to overlap the inner edge of the recess, folding the overlapping portion under the cover to form a flexible loop, attaching a distal end of the overlapping portion to the inner surface of the cover, and disposing the flexible loop proximate the inner edge of the recess about the outer edge of the cover.

A further aspect of the present disclosure is a method for mounting an airbag module within a recess in a steering wheel, wherein a flexible loop is disposed in physical contact with the inner edge of the recess that flexes to maintain the flexible loop in physical contact with the inner edge of the recess about the outer edge of the cover.

Still another aspect of the present disclosure is a method for mounting an airbag module within a recess in a steering wheel, wherein the cover is integral with and forms the outer surface of the airbag module.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a perspective view of the steering wheel assembly of the prior art with an airbag module installed, and FIG. 1A is an enlarged perspective view designated 1A as shown in the steering wheel assembly shown in FIG. 1;

FIG. 4 is a perspective view of the airbag module of the present disclosure;

FIG. 5 is a cross-sectional view taken along section line V-V of FIG. 4 showing the airbag module of the present disclosure; and FIG. 6 is an enlarged cross-sectional view of the airbag assembly of the present disclosure installed within the recess of the steering wheel assembly.

DETAILED DESCRIPTION OF THE PREFERRED EMBODIMENTS

Figure 2:
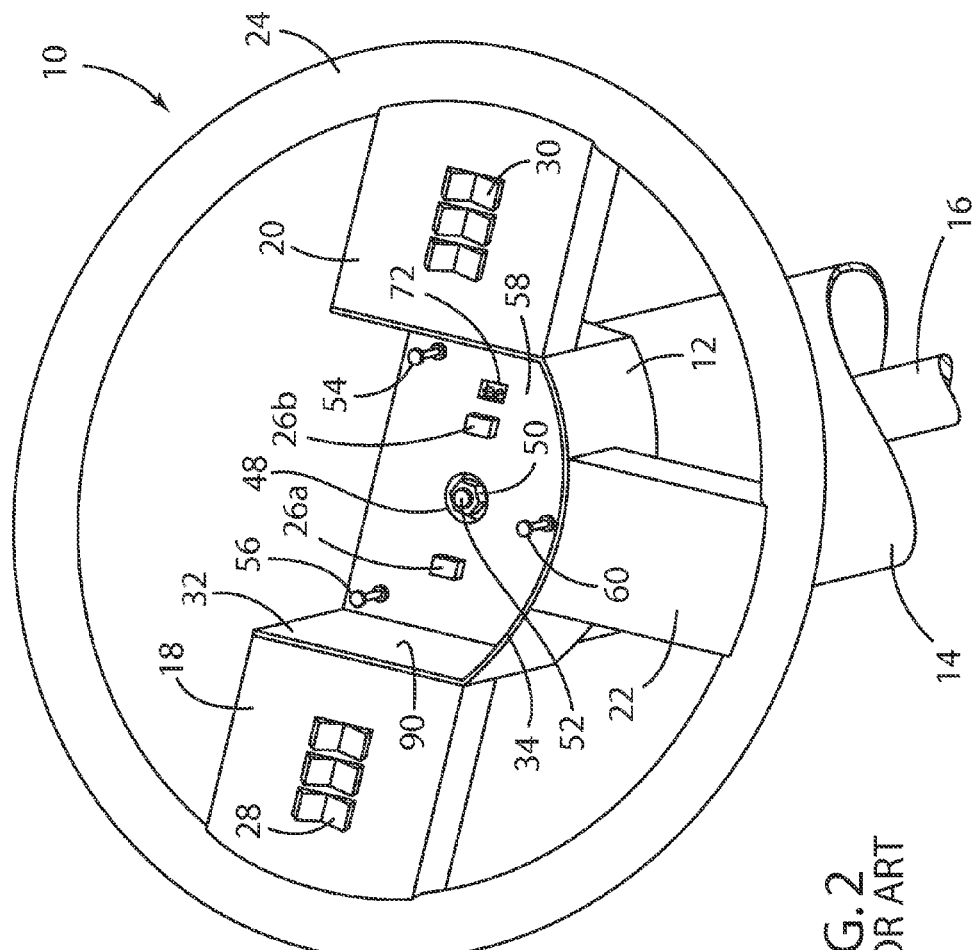
FIG. 2 is a perspective view of a steering wheel assembly of the prior art with the airbag module removed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a steering wheel assembly 10 for a motor vehicle is shown. The steering wheel assembly 10 includes a hub portion 12 rotationally mounted to a steering column 14 within which a steering shaft 16 rotates. As shown, three spokes 18, 20, 22 extend from the hub portion 12 to a circular steering wheel rim 24. While three spokes 18, 20, 22 are shown, the number can be increased or decreased depending upon the design considerations. As typical, and as shown in FIG. 1, the hub portion 12 contains the horn actuation switch 26a, 26b. Typically, the horn of the motor vehicle is actuated by depressing the hub portion 12, on either the right or left side, to close an electrical contact in the horn actuation switch 26a, 26b, which in turn energizes the horn assembly (not shown) to emit an audible signal. Additional controls 28, 30 can be included on the steering wheel assembly 10, primarily the laterally extending spokes 18, 20, wherein controls for cruise control and interactive features of the motor vehicle, such as navigation, heating and cooling ventilation, and hands-free mobile telephone operation. Alternatively, such controls 28, 30 can be located on the hub portion 12, but this tends to increase assembly complexity.

As shown in FIG. 1, the hub portion 12 of the steering wheel assembly 10 is provided with a recess 32. The recess 32 basically is defined by an outer perimeter 34 of the hub portion 12 and abuts the pair of laterally extending spokes 18, 20 and the vertically depending spoke 22. The recess 32 is formed by a vertically extending wall 36 that has an inner edge 38, wherein the wall 34 abuts the spokes 18, 20, as mentioned above, and thereby defines the recess 32 within which an airbag module 40 may be mounted. The airbag module 40, as can be seen in FIG. 1, is received within the recess 32 and essentially fills the recess 32 to form an otherwise finished steering wheel assembly 10.

The top of the airbag module 40 is provided with a cover 42 that is typically fabricated from a material and color to match the finish of the overall steering wheel assembly 10. The cover 42 can be attached to and integral with the preassembled airbag module 40 or attached as a separate component, but is situated so that the airbag module 40 can move up and down within the recess 32 so that the horn actuation switch 26a, 26b may might be actuated. That is, by depressing the left or right side of the airbag module 40 when it is mounted within the recess 32, the airbag module 40 is depressed into the recess 32 and is thereby caused to contact the horn actuation switch 26a, 26b which, as noted above, will energize the horn and provide the audible signal. Around an outer periphery 44 of the airbag module 40, as it is mounted within the recess 32, the prior art has suffered from a gap 46, as discussed above, and the disadvantages attendant thereto.

As shown in FIG. 2, the recess 32 includes a center hub portion 48 with a threaded fastener 50 for receiving a threaded spindle 52 of the steering shaft 16 by which the steering wheel assembly 10 can be attached to the steering column 14 by a threaded fastener 50, as is common. On either side of the center of the hub portion 48 of the steering wheel assembly 10 are the right horn actuation switch 26a and the left horn actuation switch 26b. Disposed at an upper corner of either side is an upwardly-extending bayonet-type fastener 54, 56 which extends vertically above a floor 58 of the recess 32. A similar upwardly-extending bayonet fastener 60 extends vertically near the vertical spoke 22. Each of the vertically extending bayonet fasteners 54, 56, 60 are received with a socket 62 formed in the bottom 70 of the airbag module 40. The fastener socket 62 is provided with a collar 64, which resiliently engages an enlarged upper portion 66 of each of the bayonet fasteners 54, 56, 60 to provide a resilient fit of the bayonet fasteners 54, 56, 60 within its respective fastener socket 62. The bayonet fasteners 54, 56, 60 are preferably fabricated from an elastomeric plastic material with sufficient strength and rigidity to hold and retain the airbag module 40 within the recess 32 after being received within socket 62, but yet allow the airbag module 40 to be removed when needed for service and/or replacement. A connector 68 is provided at the bottom 70 of the airbag module 40 for insertion into a corresponding socket 72 in the floor 58 of the recess 32 for electrically coupling the airbag module 40 to the motor vehicle control systems so that it can be properly deployed when appropriate.

Figure 3:
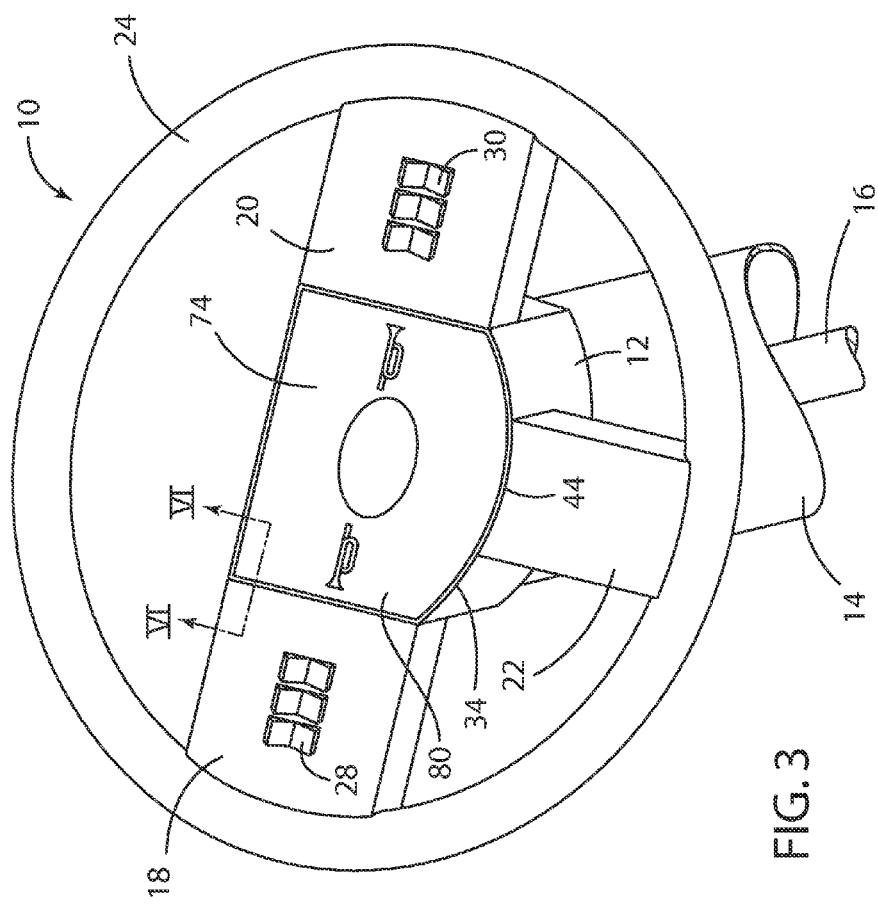
FIG. 3 is a perspective view of a steering wheel assembly in accordance with the present disclosure with the airbag module installed.

As best seen in FIG. 3, the improvement of the present disclosure can be seen, whereas an improved airbag module 74 is provided with an outer edge 76 that is uniquely constructed to form a flexible loop 78 so that it is brought into proximate relation with the inner edge 38 of the recess 32 about an outer edge 76 of the airbag module 74. Thus, the gap 46 which had previously been a problem in the industry is eliminated.

As shown in FIGS. 5 and 6, the airbag module 74 includes the cover 80 over an upper portion 82 thereof which is folded over a rearward portion 84 and extends partially down and rearward of the airbag module 74, as shown. The cover 80 can be made from any material, but more commonly is made from leather and/or a leather-type product, such as vinyl. The cover 80 has an outer surface 86 and an inner surface 88 disposed over and proximate the airbag module 74, and, as shown, substantially occludes the opening 90 of the recess 32. Underneath the cover 80 is a plastic insert 92 which supports and provides structure to the cover 80. The plastic insert 92 has a perforated seam 94, which extends transversely between the two laterally extending spokes 18, 20 and which is designed to separate in the event of airbag deployment. A further seam 96 is provided in the inner surface 88 of the cover 80, which is not visible from the outside of the cover 80, but likewise provides the ability of the cover 80 to separate and allow the airbag to deploy.

The opening 90 of the recess 32 can be of any shape, as dictated by design considerations. However, in accordance with the present disclosure, the outer edge 76 of the airbag cover 80 is designed to closely correspond to the shape of the inner edge 38 of the opening 90 of the recess 32.

In accordance with the present disclosure, the outer edge 76 of the cover 80 is defined by the flexible loop 78 of cover 80 formed by extending an overlapping portion 98 of the cover 80 that normally would extend over and overlap the inner edge 38 of the recess 32. This overlapping portion 98 of the cover 80 is then folded under the cover 80 and is attached at a distal end 100 of the overlapping portion 98 to the inner surface 88 of the cover 80, with the plastic insert 92 between. Alternately, the distal end 100 of the overlapping portion 98 may be attached to an outer wall 112 of the airbag module 74. Preferably, the attachment can be by adhesive 102, but can also be accomplished by other means, such as stitching and/or heat welding. The outer edge 76 of the flexible loop 78, as shown in FIG. 6, is thus disposed proximate to, if not in contact with, the inner edge wall 38 of the recess 32 about the outer edge 76 of the cover 80. As shown, the flexible loop 78 is integral with the cover 80, but it is contemplated the flexible loop 78 could be a separate piece which is subsequently attached to the cover 80.

The airbag module 74, as is known, includes a deployable airbag 104 which, as shown in FIG. 5, is folded within the airbag module 74 awaiting deployment as might be required. An inflator 106 is likewise situated proximate to the folded airbag 104 for generating a gaseous propellant, such as sodium azodine, with which the airbag 104 is inflated to provide protection of the occupant, in this case, the driver. As shown, there is a horn switch actuating plate 108 that is disposed on the bottom of the airbag module 74, which, when installed within the recess 32 of the steering wheel assembly 10, is brought into juxtaposed contact with each of the horn actuation switches 26a, 26b. As shown, the resilient bayonet fasteners 54, 56, 60 resiliently urge upwardly on the airbag module 40 as it is situated within the recess 32, but allows some vertical displacement of the airbag module 40 within the recess 32, so that it may cause the switch depression of one or both of the horn actuation switches 26a, 26b to provide energization to the horn assembly.

As shown in FIGS. 3 and 4, the flexible loop 78 is preferably disposed substantially completely around an outer periphery 110 of the cover 80, except, of course, on the upper portion 82, where the airbag cover 80 is folded over the edge and down the upper and rearward portion 82, 84 of the airbag module 74. This structure may potentially leave a gap 46, but such a gap 46 is not within the sight of the driver and/or occupants. Thus, the aesthetic issues noted above are not present. Preferably, the flexible loop 78 is in physical contact with the inner edge 38 of the recess 32. However, it is contemplated that a position just short of contact with the inner edge 38 of the recess 32 would accomplish the objectives of the present disclosure. The flexible loop 78 disclosed herein could also be used in shingle or inclined shingle orientation relative the inner edge 38 of the recess 32 to overlap the recess 32, as well as in abutting orientation, as shown in FIGS. 5 and 6. Of course, as shown, the airbag module 74 substantially occludes the opening 90 of the recess 32 to provide a neat trim, aesthetic appearance that avoids the creation of a visible gap 46, however, yet allows the actuation of the horn actuation switches 26a, 26b without impeding the actuation of the same. The disclosure herein thus offers zero or near zero gap between the steering wheel and driver airbag gap 46.

An aspect of the present disclosure is likewise a method for a mounting an airbag module 74 within a recess 32 of a steering wheel assembly 10. The method comprises the steps of providing a cover 80 having an outer surface 86 and inner surface 88 disposed over and proximate the airbag module 74 substantially occluding the opening 90 of the recess 32. The cover 80 has a predetermined shape corresponding to the shape of the opening 90 of the recess 32 and an outer edge 76 corresponding to an inner edge 38 of the recess 32. The method includes extending an overlapping portion 98 of the cover 80 to overlap the inner edge 38 of the recess 32, folding the overlapping portion 98 under the cover 80 to form a flexible loop 78, attaching a distal end 100 of the overlapping portion 98 to or below the inner surface 88 of the cover 80, and disposing the flexible loop 78 proximate the inner edge 38 of the recess 32 about the outer edge 76 of the cover 80.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle steering wheel within which an airbag module is mounted, the steering wheel comprising a recess within which the airbag module is received, the recess having an opening of a predetermined shape, and a cover having an outer surface and an inner surface disposed over and proximate the airbag module and substantially occluding the opening of the recess, the cover having a predetermined shape corresponding to the shape of the opening of the recess and an outer edge corresponding to an inner edge of the recess, wherein the outer edge of the cover comprises a flexible loop formed by extending an overlapping portion of the cover in relation to the inner edge of the recess to overlap the inner edge of the recess, folding the overlapping portion under the cover and attaching a distal end of the overlapping portion below the inner surface of the cover, whereby the flexible loop is proximate the inner edge of the recess about the outer edge of the cover.

2. The steering wheel of claim 1, wherein the flexible loop is integral with the cover.

3. The steering wheel of claim 1, wherein the flexible loop is a separate component attached to the cover.

4. The steering wheel of claim 3, wherein the flexible loop is attached to the inner surface of the cover with an adhesive.

5. The steering wheel of claim 1, wherein the cover is fabricated from leather.

6. The steering wheel of claim 1, wherein the cover is fabricated from vinyl.

7. The steering wheel of claim 1, wherein the cover is integral with and forms the outer surface of the airbag module.

8. The steering wheel of claim 1, wherein an outer portion of the cover forms a visible outer periphery about the cover and the flexible loop is disposed substantially completely around the visible portion of the outer periphery of the cover.

9. The steering wheel of claim 1, wherein the flexible loop is in physical contact with the inner edge of the recess.

10. The steering wheel of claim 1, wherein the steering wheel further comprises a horn actuation switch actuated by depressing and displacing the airbag cover and wherein the flexible loop remains proximate the inner edge of the recess about the outer edge of the cover when the horn actuation switch is actuated by depressing and displacing the cover.

11. The steering wheel of claim 10, wherein the flexible loop is in abutting physical contact with the inner edge of the recess and the flexible loop flexes to maintain the flexible loop in physical contact with the inner edge of the recess about the outer edge of the cover.

12. The steering wheel of claim 10, wherein the steering wheel further comprises a horn actuated by depressing and displacing the airbag cover over and proximate the airbag module and wherein the flexible loop remains proximate the inner edge of the recess about the outer edge of the cover when the horn is actuated by depressing and displacing the cover.

13. The steering wheel of claim 12, wherein the flexible loop is in abutting physical contact with the inner edge of the recess and the flexible loop flexes to maintain the flexible loop in physical contact with the inner edge of the recess about the outer edge of the cover.

14. A steering wheel having a recess within which an airbag module is received, the recess having an opening, and a cover disposed over the airbag module and substantially occluding the opening of the recess, the cover having an outer edge corresponding to an inner edge of the recess, wherein the outer edge of the cover comprises a flexible loop proximate the inner edge of the recess about the outer edge of the cover.

15. The steering wheel of claim 14, wherein the flexible loop is formed by extending a portion of the cover in relation to overlap the inner edge of the recess, folding the overlapping portion under the cover, and attaching a distal end of the overlapping portion to the inner surface of the cover.

16. The steering wheel of claim 12, wherein the flexible loop is in abutting contact with the inner edge of the recess.

17. The steering wheel of claim 16, wherein the flexible loop overlaps the inner edge of the recess.

18. A method for mounting an airbag module within a recess in a steering wheel, the recess having an opening of a predetermined shape, the method comprising the steps of:
providing a cover having an outer face and inner surface disposed over and proximate the airbag module substantially occluding the opening of the recess, the cover having a predetermined shape corresponding to the shape of the opening of the recess and an outer edge corresponding to an inner edge of the recess;
extending an overlapping portion of the outer edge of the cover to overlap the inner edge of the recess;
folding the overlapping portion under the cover to form a flexible loop;
attaching a distal end of the overlapping portion to the inner surface of the cover; and
disposing the flexible loop proximate the inner edge of the recess about the outer edge of the cover.

19. The method of claim 18, wherein the flexible loop is disposed in physical contact with the inner edge of the recess and the flexible loop flexes to maintain the flexible loop in physical contact with the inner edge of the recess about the outer edge of the cover.

20. The method of claim 19, wherein the cover is integral with and forms the outer surface of the airbag module.

* * * * *